(12) United States Patent
Fahrion

(10) Patent No.: US 7,054,711 B1
(45) Date of Patent: May 30, 2006

(54) UNIT FOR THE PRODUCTION OF TRACK ELEMENTS

(76) Inventor: Otmar Fahrion, Remsstr. 11, Kornwestheim (DE) 70806

( * ) Notice: Subject to any disclaimer, the term of this patent is extended or adjusted under 35 U.S.C. 154(b) by 444 days.

(21) Appl. No.: 10/168,837

(22) PCT Filed: Nov. 18, 2000

(86) PCT No.: PCT/EP00/11451

§ 371 (c)(1),
(2), (4) Date: Jun. 21, 2002

(87) PCT Pub. No.: WO01/49447

PCT Pub. Date: Jul. 12, 2001

(30) Foreign Application Priority Data

Dec. 31, 1999 (DE) ................................. 199 63 980

(51) Int. Cl.
*G06F 19/00* (2006.01)
(52) U.S. Cl. .................. 700/159; 700/163; 409/131; 409/199; 72/214; 72/219; 72/311
(58) Field of Classification Search ................ 700/159, 700/163; 409/199, 131; 403/373; 451/180; 285/420, 406; 104/118–121; 29/822–824; 72/214, 216, 219, 298, 310, 308
See application file for complete search history.

(56) References Cited

U.S. PATENT DOCUMENTS

| | | | |
|---|---|---|---|
| 3,675,915 A | | 7/1972 | Vigus ........................... 269/58 |
| 4,732,515 A | * | 3/1988 | Pomikacsek ................. 409/131 |
| 5,195,573 A | * | 3/1993 | Cryderman et al. ........ 164/476 |
| 5,421,185 A | * | 6/1995 | Castricum ..................... 72/338 |
| 5,667,209 A | * | 9/1997 | Lenzkes ....................... 269/93 |

FOREIGN PATENT DOCUMENTS

| | | |
|---|---|---|
| DE | 35 37 557 A1 | 4/1986 |
| DE | 34 19 753 C2 | 4/1987 |
| EP | 0 151 283 | 12/1984 |
| EP | 0 410 453 A1 | 6/1990 |
| EP | 0 698 685 A1 | 8/1995 |
| JP | 10-46502 A | 2/1998 |
| JP | 10-46503 A | 2/1998 |

OTHER PUBLICATIONS

Raschbichler, H.G., "Der Stahlfahrweg der Transrapid Versuchsanlage Emsland (*TVE*)," Eisenbahntechnische Rundschau (ETR), Hestra-Verlag, 1984, Jg. 33, Heft 6, S. 487-492.

* cited by examiner

*Primary Examiner*—Anthony Knight
*Assistant Examiner*—Thomas Pham
(74) *Attorney, Agent, or Firm*—Factor & Lake

(57) ABSTRACT

According to the invention, a unit (10) is proposed for the production of track elements (25), which comprises a plurality of clamping devices (14) arranged one after another in the longitudinal direction of the unit. Provided in the clamping devices (14), there is in each case a pedestal element (16), which is fixed to the floor, and a clamping table (24) which is connected at least indirectly to the pedestal element (16). A portion of a track element (25) may be placed on each clamping table (24). In order to enable the prefabrication of track elements (25) whereof the curvature, longitudinal profile and camber are individually different, the clamping tables (24) are positionally adjustable with respect to the particular pedestal element (16).

19 Claims, 3 Drawing Sheets

UNIT FOR THE PRODUCTION OF TRACK ELEMENTS

Figure 1:
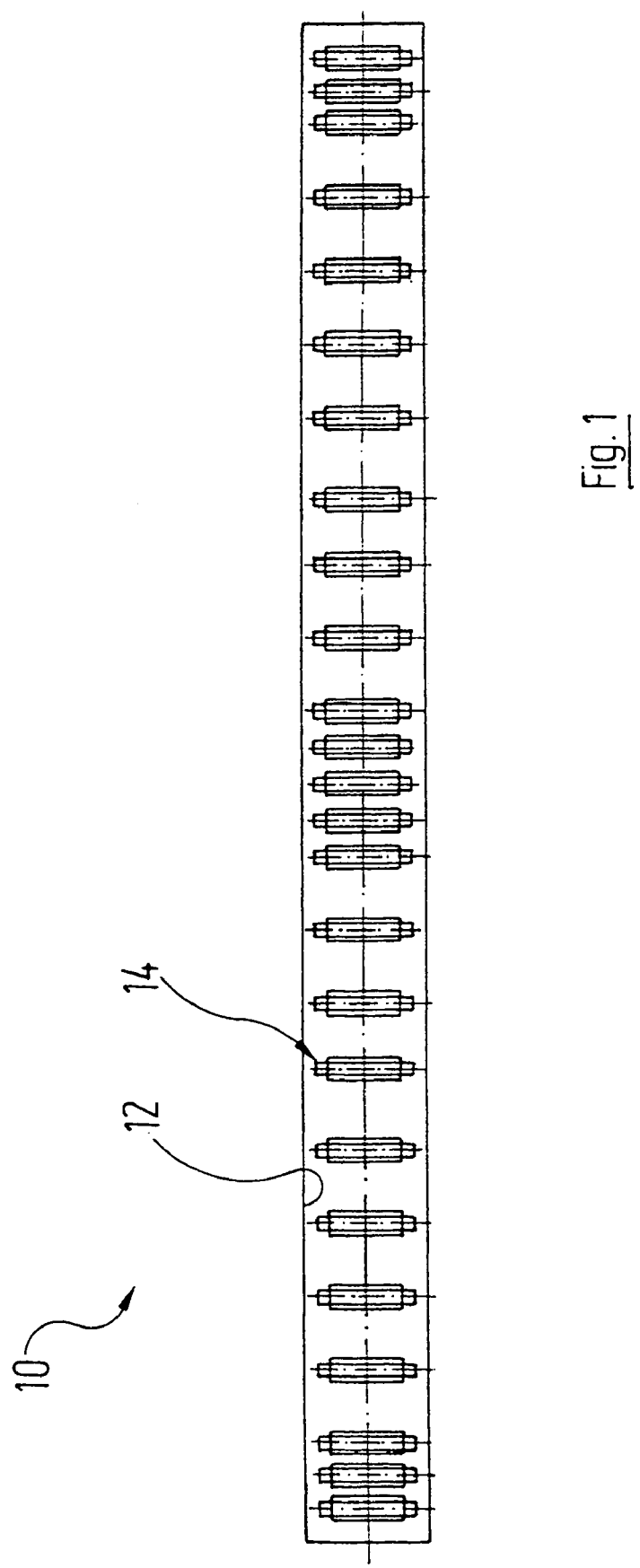

The present invention relates to a unit for the production of track elements.

Tracks, in particular railway tracks and, here, in particular railway tracks for magnetic-levitation transport systems, are composed of individual track elements. In the case of commercially known track elements for a magnetic-levitation transport system, these are concrete parts which are produced on site. In order to simplify manufacture and reduce the production costs, future track elements will be prefabricated as metal parts in a factory. These metal parts will then be brought to the track site and mutually connected there such that the course of the track is as continuous as possible, even with different land profiles. The track elements intended for a magnetic-levitation transport-system project are for example 62 m long and are arranged above the surface of the ground on supports. These track elements are steel components made of thick-walled steel plate. In cross-section, these track elements have a trapezoidal box-type profile having two upper transverse cross arms in the installed position, so that an approximately T-shaped cross-section is obtained overall.

Although the said track elements are all approximately the same length, they differ in terms of their detail geometry. Amongst other things, this refers for example to an individual bending about a vertical axis (curvature), about a horizontal axis extending transversely to the longitudinal axis of the track element (longitudinal profile) and about an axis extending parallel to its longitudinal axis (twist or camber). These geometrical properties are determined individually for each track element, according to the geographical characteristics at the site at which the particular track element is to be used in construction.

In spite of the thus relatively complex and individually different detail geometry of the individual track elements, a high degree of precision is required during production. In the case of the said track elements, with a track element having an overall length of approximately 62 m, a maximum manufacturing tolerance of 1 mm is permitted at the location of the joins. So that these demands for high precision can be satisfied, very high demands are likewise placed on the units in which the individual track elements are prefabricated. With this, the units themselves, and also the production of the track elements, should be as economical as possible. The unit according to the invention which is indicated in claim 1 meets these requirements.

The unit according to the invention is made up of a plurality of clamping devices, which are arranged one after another in the longitudinal direction of the unit and have clamping tables. Here, the clamping tables are positionally adjustable such that each clamping table can be adapted to the individual geometry and position of that portion of a track element which is to be placed thereon. Thus, a type of "spherical bed" is created, which reproduces the individual detail geometry of the particular track element. As a result of the adjustability, it is possible to produce different track elements using the same clamping device, as a result of which the cost of the unit, and the manufacturing costs for the individual track elements, are considerably reduced.

Advantageous further developments of the invention are indicated in the sub-claims.

The further development of the invention according to claim 2, provides for the preferred adjustment directions and pivot axes.

A clamping device according to claim 3 is particularly robust and reliable in operation.

A rapid and reliable pivotal movement of the clamping table of a clamping device of the unit is produced in the further development of the invention according to claim 4.

The further development of the invention represented in claim 5 enables simple vertical adjustment and pivoting of a clamping table.

The adjustment of the position of a clamping table in the lateral direction, as seen in the longitudinal direction of the unit, is enabled in simple manner as a result of the further development of the invention described in claim 6.

To obtain defined geometrical ratios at any point during the procedure for producing a track element, it should be possible to fix the appropriate portion of the track element on a clamping table. Claim 7 indicates a way in which this is possible.

In the event of different local geometrical characteristics along the track element, the inventive further development according to claim 8 increases the universal usability of a clamping device of the unit.

The manner in which the track element is inserted into, and removed from, the clamping device is facilitated by the further development of the invention indicated in claim 9. It is moreover possible to manufacture track elements having different widths on a clamping device of this type.

Claim 10 indicates a further development of the invention, which enables reliable and convenient positional adjustment and simple pivoting of the clamping table of a clamping device of the unit according to the invention.

The position and location in space of a clamping table can be adjusted automatically as a result of the further development of the invention according to claim 11.

The precision during production of a track element is monitored by the further development of the invention claimed in claim 12. This further development is also useful for documentation and quality assurance.

The further development of the invention according to claim 13 facilitates assembly and reduces the time required for production of a track element.

The further development of the invention according to claim 14 is particularly preferred: In this, the clamping tables are constructed such that the track element can be constructed in a head-first position. Here, for assembling a track element on the clamping table of the individual clamping devices, the upper cover plate of the track element, for example, is placed on first. The lateral and other elements of the track element can then be connected to the cover plate and to one another for example by spot welding or tack welding. Thus, in the unit according to the invention, the track element is constructed in a "head-first" position. The term "head-first" here refers to the future installed position, that is to say that, at the end of the assembly procedure, the track element lies on the clamping tables with its future top side at the bottom.

Figure 2:
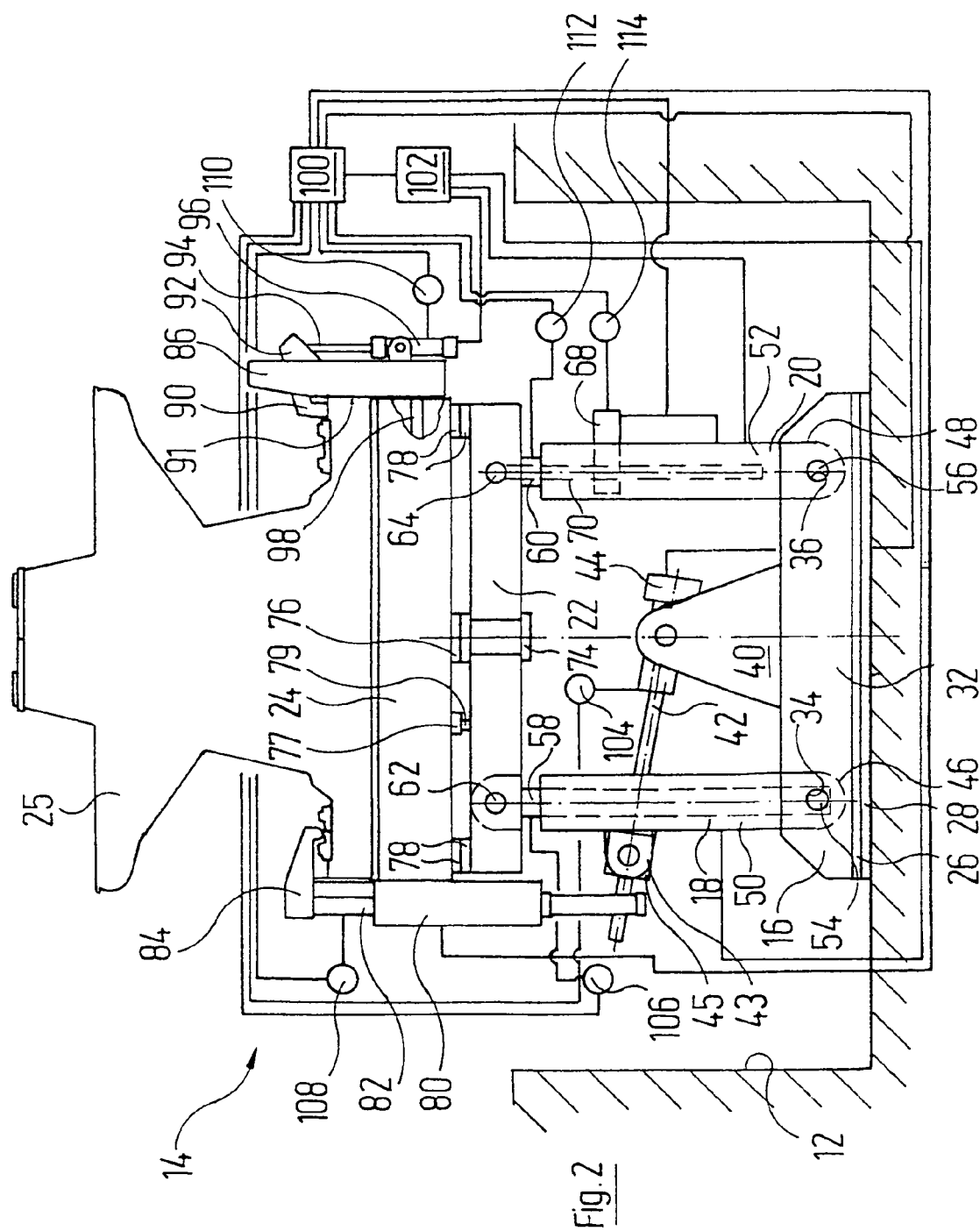

An exemplary embodiment of the invention is now explained in detail, with reference to the accompanying drawing, which shows:

FIG. 1: a schematic plan view of a unit for producing track elements, having a plurality of clamping devices;

FIG. 2: a schematic front view of a clamping device from FIG. 1; and

Figure 3:
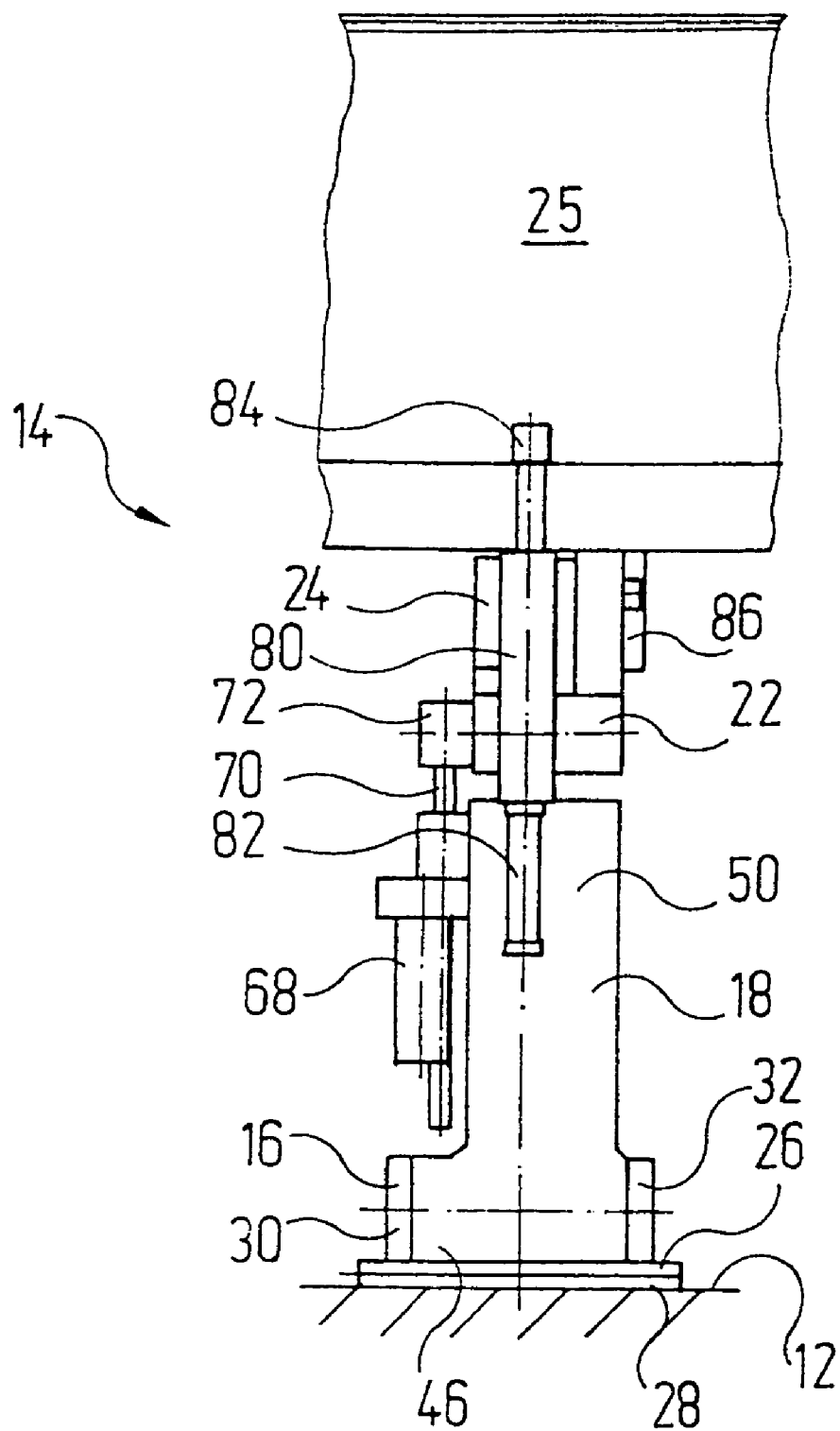

FIG. 3: a schematic side view of the clamping device from FIG. 2.

In FIG. 1, a unit for producing track elements is denoted as a whole by the reference numeral 10. It includes an elongated cavity 12, which is present in the floor portion, is rectangular in plan view and in which a total of 25 clamping devices 14 are arranged distributed over its length. The length of the cavity 12 is somewhat greater than the length of a track element (not illustrated in FIG. 1). The spacings between the individual clamping devices 14 are smaller in the centre and in the two end regions of the unit 10 than in the other regions.

One of the clamping devices 14 is now explained in detail with reference to FIGS. 2 and 3, it being understood that the individual clamping devices 14 of the unit 10 can all be realised in identical manner.

The clamping device 14 includes a pedestal element 16, an intermediate element 22, which is connected to the pedestal element 16 by way of two vertical supporting elements 18, 20, and a clamping table 24 arranged above the intermediate element 22. A portion of a track element 25 lies on said clamping table.

The pedestal element 16 includes a base plate 26, which is screwed to a floor plate 28 fixed to the floor. The base plate 26 has a rectangular basic form and is aligned transversely to the longitudinal direction of the unit, which, in FIG. 2, extends perpendicularly to the plane of the Figure. Integrally moulded on the two opposing longitudinal edges which extend transversely to the longitudinal direction of the unit 10, there is in each case a vertical lug, 30 and 32 respectively, which are spaced somewhat from the respective edge and extend in each case over the length of the base plate 26 (FIG. 3). There are bearing bores 34 and 36 in the lug 30. Provided in the bearing lug 32, there are likewise bearing bores which are opposite the bearing bores 34 and 36. However, these are not shown in the Figures and therefore have no reference numeral. In a manner which will be illustrated in more detail below, the supporting elements 18 and 20 are mounted in the bearing bores 34 and 36 and the bearing bores which are not shown.

In the centre of the base plate 26, a bearing block 40, to which an electric motor 44 acting on a spindle 42 is joined in pivotal manner, is fixed to the base plate 26. The spindle 42 acts on a threaded block 45 which is rotatably fixed to a lug of the supporting element 18. The unit just described serves for laterally adjusting the position of the clamping table 24, as explained in detail further below. The supporting elements 18 and 20 each include a connecting portion, 46 and 48 respectively, and a supporting portion, 50 and 52 respectively. The connecting portions 46, 48 and the supporting portions 50, 52 have the same width in the front view illustrated in FIG. 2. As revealed in FIG. 3, as seen from the side, the respective connecting portion 46 and 48 of the supporting elements 18 and 20 is however wider than the corresponding supporting portions 50, 52, and fits between the two lugs 30 and 32 of the pedestal element 16 with a slight sliding play. Extending through the respective connecting portions 46 and 48 of the supporting elements 18 and 20, there is in each case a through bore (not illustrated) through which a respective bearing pin 54 or 56 is introduced, the ends of said bearing pin in turn being mounted in the bearing bores 34, 36 and the bearing bores (not shown) in the lugs 30, 32 of the pedestal element 16. Thus, the supporting elements 18 and 20 can pivot or tilt transversely to the longitudinal direction of the unit 10, although they are fixed against tilting in the longitudinal direction of the unit 10.

A piston rod 58, 60 is guided in vertically movable manner in each supporting element 18, 20. The upper end of the piston rods 58, 60 is connected to the intermediate element 22 by way of a cardanic bearing (not illustrated in more detail in the Figure). Part of the cardanic bearing is in each case a pin 62, 64, which engages in a bearing bush 66, 68 in the intermediate element 22. The piston rods 58 and 60 may be locked with respect to the corresponding supporting portions 50 and 52 in the respectively adjusted position by way of a device which is not shown in FIGS. 2 and 3. The piston rods 58 and 60 and the supporting portions 50 and 52 of the supporting elements 18 and 20 form a hydraulically adjustable device, which serves for adjusting the vertical position of the clamping table 24.

As can be seen in particular in FIG. 3, an electric motor 68, which drives a self-locking threaded spindle 70 extending vertically upwards, is fixed to the right-hand supporting element 20 (as seen in FIG. 2) such that it may pivot about a horizontal axis extending transversely to the longitudinal direction of the unit. The threaded spindle cooperates with a threaded block 72, which is in turn fixed to the intermediate element 22 in articulated manner. The unit comprising the electric motor 68, threaded spindle 70 and threaded block 72 is spaced from the piston rod 60 and the pivot pin clamped by the two cardanic bearings. The function of this unit is to adjust the tilting angle of the clamping table 24 about an axis which extends transversely to the longitudinal direction of the unit and substantially horizontally.

The intermediate element 22 is in the form of an elongated and relatively narrow plate extending transversely to the longitudinal direction of the unit. It has a central pivot pin 74, which extends vertically upwards and engages in a bearing bush (not shown in the Figures) in the clamping table 24. Plain bearing rings 76 are arranged about the pivot pin 74, between the intermediate element 22 and the clamping table 24. The clamping table 24 furthermore lies on the intermediate element 22 by way of plain bearing pieces 78 arranged along its lateral edges.

Transversely to the longitudinal direction of the unit, the clamping table 24 has approximately the same dimensions as the intermediate element 22, although it has a smaller width, as seen in the longitudinal direction of the unit. Fixed to underside of the clamping table 24, there is a toothed rail 77 in which a toothed wheel 79 meshes, this latter being driven by an electric motor (not shown in the Figures) arranged in the intermediate element 22. The clamping table 24 can thus be pivoted with respect to the intermediate element 22 about the vertical axis produced by the pivot pin 76.

An electric actuating drive 80 is fixed to the left-hand edge of the clamping table 24, as seen in FIG. 2, a rigid holding-down claw 84, which is directed towards the clamping table 24, being fixed to the actuating rod 82 of said actuating drive at the upper end. The actuating rod 82 may be locked by way of a device which is not illustrated. Arranged at the opposite side, at the edge of the clamping table 24, there are two vertically parallel bearing lugs, of which only the one having the reference numeral 86 is shown in the drawing and between which a holding-down claw 90 is pivotally mounted. The bearing lugs 86 form a stop 91 by means of their end faces facing the clamping table 24. A lever portion 92 of the holding-down claw 90, which is remote from the clamping table 24, is connected to the piston rod 94 of a hydraulic cylinder 96. This latter is in turn mounted in articulated manner on the two holding lugs 86 and 88. The holding lugs 86 and 88 are connected by way of a rod assembly 98 to a movement device (not shown in the Figure), by means of which it is possible to move the holding lugs 86 and 88, and thus also the holding claw 90, in the lateral direction, as seen in the longitudinal direction of the unit.

FIG. 2 moreover shows a further control and data collection device 100 and a valve block 102. The valve block 102 is hydraulically connected to the supporting elements 18 and 20 and to the hydraulic cylinder 96 for the right holding-down claw 90. It is electrically coupled to the control and data collection device 100. This receives signals from displacement sensors 104, 106, 108, 110, 112 and 114 which detect the position or the stroke of the piston rods or the spindles of the different drives. On the output side, the control and data collection device 100 is furthermore connected to the electric drives 44, 68 and 80 and to the drives (not shown) for the horizontal pivoting of the clamping table 24 and the lateral movement of the holding-down claw 96.

The unit 10 is operated in the manner below:

Firstly, the individual adjustment data for each of the 25 clamping devices 14 stored in a memory of the control and data collection device 100 are retrieved for the individual track element 25 to be produced. Then, the supporting elements 18 are controlled by the control and data collection device 100 such that the piston rods 58 and 60 move into the particular desired position. Here, the stroke of the piston rods 58 and 60 can differ within a clamping device 14, so that the intermediate element 22, and with it the clamping table 24, are tilted about an axis extending substantially parallel to the longitudinal direction of the unit 10. This takes into account a twist or camber of the track element 25 to be produced.

The strokes of the piston rods 58 and 60 can also differ from one clamping device 14 to another clamping device 14 within the unit 10, according to the desired vertical profile of the particular individual track element 25 to be produced in the unit 10.

The electric motor 44 is furthermore controlled by the control and data collection device 100, such that the threaded block 45 on the spindle 42 moves into the desired position. Since this is connected in articulated manner to the supporting portion 50 of the supporting element 18 by way of the lug 43, the supporting element 18 tilts about the pivot axis produced by the pivot pin 54. As a result, the supporting element 20 also tilts in the manner of a parallelogram, thus enabling a change in the position of the clamping table 14 in a horizontal direction which is substantially transverse to the longitudinal direction of the unit 10. An undesired change in the height of the clamping table 24, which is effected as a result, can be compensated by withdrawing the piston rods 58, 60 accordingly.

The electric motor driving the toothed wheel 79 is controlled such that the clamping table 24 pivots with respect to the intermediate element 22 in the desired manner about the vertical axis produced by the pivot pin 74. It again applies here that this change in position can be adjusted individually for each clamping device 14 of the unit 10, so that it is possible to produce a track element 25 which has a particular curvature.

The electric motor 68 is also controlled in the same way by the control and data collection device 100, so that the intermediate element 22, and with it the clamping table 24, can be tilted about a horizontal axis extending substantially transversely to the longitudinal direction of the unit by way of the threaded spindle 70 and the threaded block 72. This adjustment is also effected individually for each of the clamping devices 14 of the unit 10, according to the desired vertical profile of the track element 25 to be produced.

As a result of the above-mentioned adjustments for the clamping devices 14 of the unit 10, an individualised spherical bed is created for each track element 25, said spherical bed corresponding to the individual detail geometry of the particular track element 25.

When these adjustment operations are completed, the upper cover plate of the track element 25 to be produced is placed on the clamping tables 25 of the unit 10. It is then possible to laterally adjust the position of the stop 91 formed by the lugs 86 by actuating the movement unit acting on the rod 98, thus ensuring that the upper cover plate of the track element 25 is positioned precisely. It is now possible to fix for example lateral parts and other elements of the track element to the upper cover plate and to one another, for example by spot welding. This produces a tack-welded track element 25, standing on its head so to speak, which can undergo final welding in a subsequent operating procedure or even in the unit described.

If required, the electrical actuating drive 80 and the hydraulic cylinder 96 are also controlled by the control and data collection device 100, such that a portion or an element of the track element 25, for example a lateral edge, are clamped against the clamping table 24, thus further increasing the manufacturing precision and the safety of the operator during the production procedure.

It is thus possible to construct any number of different track elements 25 in a head-first position, i.e. with the top side at the bottom, in the same unit 10.

It is possible to check the actual adjustments of the different electrical or hydraulic actuating elements by means of the displacement sensors 104 to 114, which indicate their current setting to the control and data collection device 100. This is particularly useful for achieving the high level of manufacturing precision desired and due to the demands for quality assurance.

It goes without saying that, instead of electric or hydraulic actuating elements, it is also possible to use pneumatic or manual actuating devices.

The position assumed by the different actuating elements can take into account the twisting produced when processing the track element in anticipatory manner, so that the twisting is compensated automatically.

What is claimed is:

1. A unit for the production of track elements, having a plurality of clamping devices which are arranged one after another in a longitudinal direction of the unit and each include a pedestal element, which is fixed to a floor, and a clamping table which is connected at least indirectly to said pedestal element and is constructed such that a portion of a track element may be placed thereon and is positionally adjustable with respect to the pedestal element, wherein the clamping table of at least one clamping device is held on an intermediate element which may be moved accordingly with respect to the pedestal element, and wherein the clamping table of at least one clamping device may be pivoted about the substantially vertical third axis with respect to the intermediate element, and wherein the vertical adjustment of the clamping table of at least one clamping device, and also its pivotal movement, are effected by way of at least two mutually spaced longitudinal adjustable supporting elements connected to the pedestal element on the one hand, and at least indirectly to the clamping table on the other, and wherein a tilting angle of at least one of the supporting elements may be adjusted with respect to the pedestal element.

2. A unit according to claim 1, characterized in that the clamping table of at least one clamping device may be pivoted about at least one of: a substantially horizontal first axis, extending parallel to the longitudinal axis of the unit;

a substantially horizontal second axis, extending perpendicularly to the longitudinal axis of the unit, and a substantially vertical third axis, extending perpendicularly to the longitudinal axis of the unit.

3. A unit according to claim 1, characterized in that, provided in at least one clamping device, there is at least one lateral holding-down claw by means of which a portion of a track element may be clamped against the clamping table.

4. A unit according to claim 3, characterized in that the holding-down claw is vertically displaceable with respect to the clamping table.

5. A unit according to claim 4, characterized in that at least two mutually opposing holding-down claims are provided, whereof the mutual spacing may be varied.

6. A unit according to claim 1, characterized in that at least one of hydraulic and electric actuators, preferably electric self-locking spindle drives are provided, which effect appropriate movements.

7. A unit according to claim 6, which includes a control unit having a memory which generates signals by means of which the actuators may be moved into appropriate positions depending on data stored in memory for a particular track element.

8. A unit according to claim 7, characterized in that sensors are provided, which detect position of the clamping table and send an appropriate signal to the control unit, which in turn has a comparator device which compares the detected values with set values stored in the memory, a warning signal being generated if the detected values and the set values deviate from one another by more than a specified value.

9. A unit for the production of track elements, having a plurality of clamping devices which are arranged one after another in a longitudinal direction of the unit and each include a pedestal element, which is fixed to a floor, and a clamping table which is connected at least indirectly to said pedestal element and is constructed such that a portion of a track element may be placed thereon and is positionally adjustable with respect to the pedestal element, wherein at least one of hydraulic and electric actuators, preferably electric self-locking spindle drives are provided, which effect appropriate movements, and wherein a control unit having a memory which generates signals by means of which the actuators may be moved into appropriate positions depending on data stored in memory for a particular track element, and wherein sensors are provided, which detect position of the clamping table and send an appropriate signal to the control unit, which in turn has a comparator device which compares the detected values with set values stored in the memory, a warning signal being generated if the detected values and the set values deviate from one another by more than a specified value.

10. A unit according to claim 9, characterized in that the clamping table of at least one clamping device may be pivoted about at least one of: a substantially horizontal first axis, extending parallel to the longitudinal axis of the unit; a substantially horizontal second axis, extending perpendicularly to the longitudinal axis of the unit, and a substantially vertical third axis, extending perpendicularly to the longitudinal axis of the unit.

11. A unit according to claim 9, characterized in that the clamping table of at least one clamping device is held on an intermediate element which may be moved accordingly with respect to the pedestal element.

12. A unit according to claim 11, characterized in that the clamping table of at least one clamping device may be pivoted about the substantially vertical third axis with respect to the intermediate element.

13. A unit according to claim 12, characterized in that vertical adjustment of the clamping table of at least one clamping device, and also its pivotal movement, are effected by way of at least two mutually spaced longitudinal adjustable supporting elements connected to the pedestal element on the one hand, and at least indirectly to the clamping table on the other.

14. A unit according to claim 13, characterized in that a tilting angle of at least one of the supporting elements may be adjusted with respect to the pedestal element.

15. A unit according to claim 9, characterized in that, provided in at least one clamping device, there is at least one lateral holding-down claw by means of which a portion of a track element may be clamped against the clamping table.

16. A unit according to claim 15, characterized in that the holding-down claw is vertically displaceable with respect to the clamping table.

17. A unit according to claim 16, characterized in that at least two mutually opposing holding-down claims are provided, whereof the mutual spacing may be varied.

18. A unit according to claim 9, characterized in that, provided on the clamping table of at least one clamping device, there is at least one lateral stop against which a portion of the track element may be placed.

19. A unit according to claim 9, characterized in that the clamping tables are constructed such that a portion of a track element may be placed in a head-first position which is rotated through 180° with respect to a future installed position.

* * * * *